Jan. 9, 1945.   J. SOUTAR   2,366,987
SHEAR FOR FLANGED METAL SHAPES
Filed Oct. 23, 1943   2 Sheets-Sheet 1
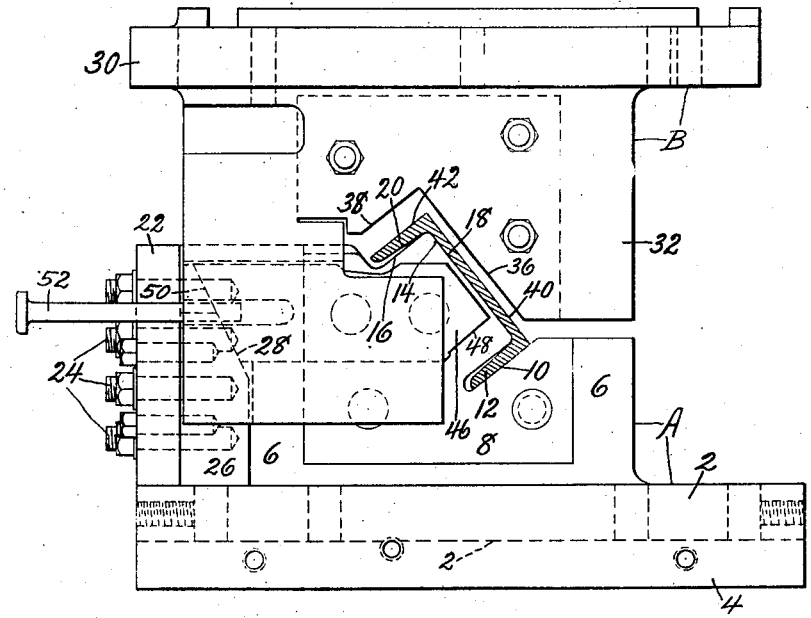
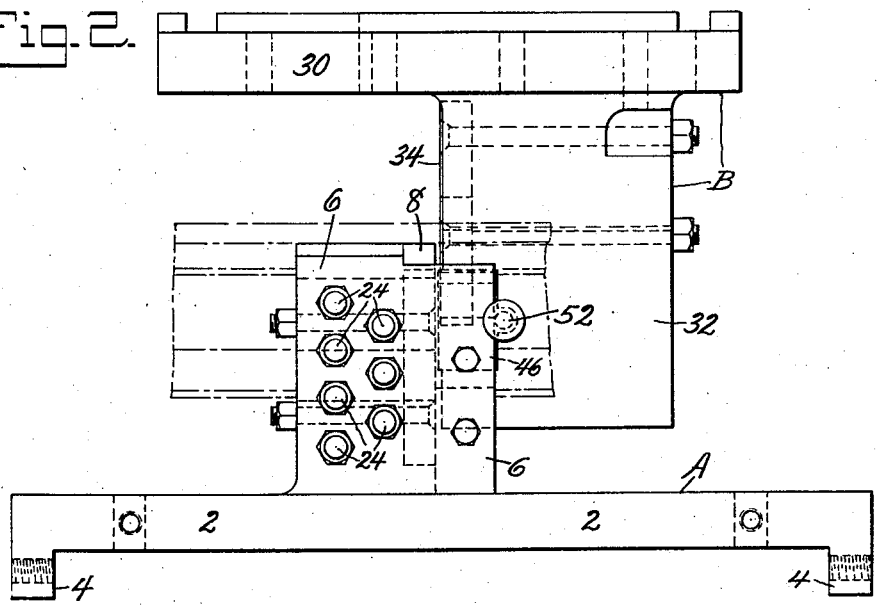
INVENTOR
John Soutar
BY
Robert A. Shield
ATTORNEY

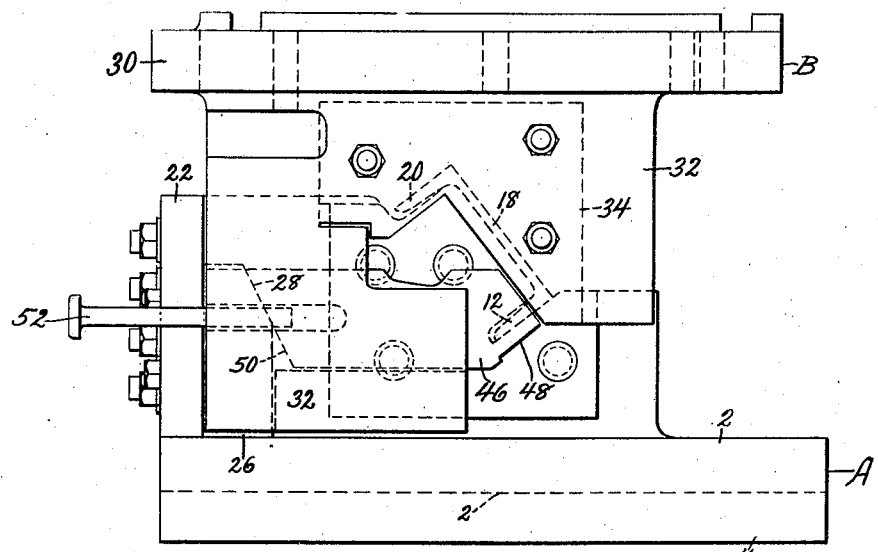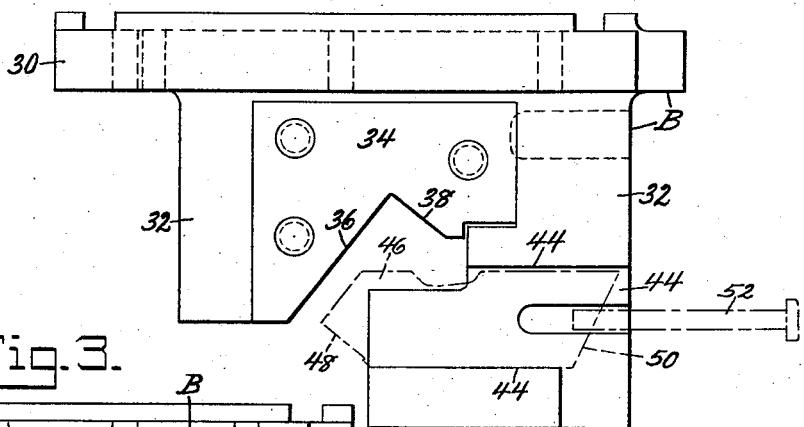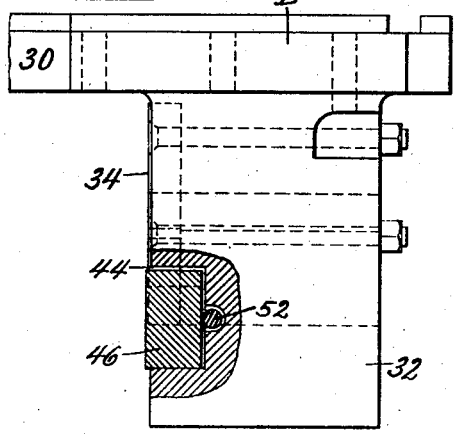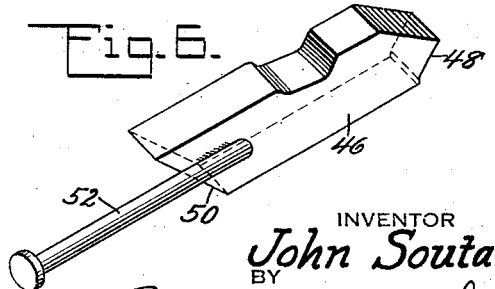

Patented Jan. 9, 1945

2,366,987

UNITED STATES PATENT OFFICE 2,366,987

SHEAR FOR FLANGED METAL SHAPES

John Soutar, Huntington, W. Va., assignor to American Car and Foundry Company, New York, N. Y., a corporation of New Jersey Application October 23, 1943, Serial No. 507,413

8 Claims. (Cl. 164—47)

This invention relates to metal shears in general and particularly to shears designed to cut channels or other flanged metal shapes having a plurality of angularly disposed elements.

It has been found extremely hard in shearing flanged metal shapes to hold the parts in proper position and obtain a square shear in all cases where the shapes are formed of more than two elements. It has been found necessary in shearing large channels to first make a rough shear then true up the channel by making two angle cuts, one through one flange and part of the web, and the other through the other flange and the remainder of the web. Such a shearing procedure involving three separate operations is expensive and approaches the sawing cost. Certain flanged metal shapes formed of more than three elements, such as channels, have been sheared in a single operation, but in substantially all cases the member had to be trued up in case an exact cut was required. It is an object, therefore, of the present invention to provide a shear for flanged metal shapes formed of more than three elements and in which the shapes are sheared by blades moving simultaneously in two directions.

A further object of the invention is the provision of a shear for flanged metal shapes in which the shear blade moves substantially vertical, while a second shear blade moves both horizontally and vertically.

A still further object of the invention is the provision of a shear machine for flanged metal shapes, such as channels, and having two shear blades, one moving through the web and one flange from the outside toward the inside, and a second shear blade moving through the remaining flange from the inside toward the outside.

These and other objects of the invention will be apparent to persons skilled in the art from a study of the following description and accompanying drawings, in which:

Fig. 1 is an end view of the improved shear;

Fig. 2 is a side view of the improved shear;

Fig. 3 is a side view of the head member of the shear with a part broken away to better disclose the construction;

Fig. 4 is an end view of the head member;

Fig. 5 is an end view of the shear members similar to Fig. 1 but showing the parts in lowered position after shearing of the flanged shape, and Fig. 6 is a perspective view of the second shear blade carried by the head member.

Referring now to the drawings in detail, it will be seen that the shear is made up of two main parts, namely, a base member A and a head member B. The base member A is formed with a flat plate 2 adapted to be secured to the operating machine base (not shown) through the use of downturned flanges 4. Projecting upwardly from the flat plate is a support member 6 having its upper part shaped to conform roughly to the cross-section of the metal shape which is to be sheared. Attached to this upwardly projecting support is a hardened metal member 8 having one shear edge 10 adapted to support the outside of flange 12 of the channel. The hardened metal member 8 is also provided with angularly disposed shear edges 14 and 16 adapted to support, respectively, the web 18 and flange 20 of the flanged metal shape. A plate 22 is fastened by any suitable means, such as stud bolt 24, to one side of the upstanding support 6 and this plate is formed on its inner face with a projection 26 having an inclined surface 28 inclined downwardly toward the center of the support. It will be obvious that by changing the contour of the support member and the hardened metal plate 8, various flanged metal shapes other than channels can be accommodated.

The second main part or head member B is formed with a top plate 30 adapted to be secured to a reciprocating part of the machine to which the shear is attached. This head member is formed with a downwardly extending projection 32 having an irregular shaped lower surface adapted to at least partially embrace the flanged metal shape which is to be sheared. In the present instance the downwardly extending projection has attached thereto a hardened shear blade 34, which shear blade is formed with shearing surfaces 36 and 38 adapted to contact the outer surfaces 40 and 42, respectively, of the web 18 and flange 20 of the flanged metal shape. The lower portion of the projection 32 which partially embraces the flanged metal shape is formed with an open sided slot 44 adapted to receive a second shear blade 46. This shear blade, as clearly shown in Figs. 1, 3 and 4, is mounted in the slot 44 for transverse sliding movement relative to the support and to the shear blade 34. This second shear blade is formed with a shearing edge 48 adapted to shear through the flange 12 of the flanged metal shape. As clearly shown in Figs. 1, 5 and 6, the sliding shear blade 46 is formed with an inclined rear edge 50 adapted to cooperate with and slide along the inclined surface 28 previously referred to. Coaction between the inclined surfaces 50 and 28 during downward movement of the head member will cause the shear blade 46 to move laterally inward with respect to the head. In order that the shear blade may be retracted, a handle 52 is welded or otherwise secured thereto and projects outwardly past the support member and attached plate 22 in order that an operator may grasp the handle and move the slide to its retracted position shown in Fig. 1. If desired, spring means may be used in connection with the handle in order that the shear blade 46 will automatically retract upon raising of the head member 32.

In operation the flanged metal shape, such as the channel shown, is slid into position between the various shearing edges of the support and head member. Upon vertical downward movement of the head member 32, the shearing edge 36 of blade 34 contacts the upper, outer corner of the web 18 and shears downwardly through this web. At about the time that the shearing edge 36 has moved through web 18 from the outside toward the inside, the shearing edge 38 will contact flange 20 and move downwardly through this flange. During the downward motion of head 32 the second shearing blade 46 will also move vertically downward since it is held in slot 44 of the head. However, as the head moves downwardly the inclined surface 50 of the sliding shear blade 46 will cooperate with inclined surface 28 of the support and will move the sliding blade inwardly. At about the time, or shortly after, the shearing edge 38 contacts flange 20, the shearing edge 48 of blade 46 will contact flange 12. Continued downward movement of the head will cause the various shearing edges of the blades carried by the head to move through the various elements of the flanged metal shape and past the shearing edges 10, 14 and 16 of the upport shearing plate 8. It will be seen from the preceding that the blade 34 moves in a substantially vertical direction, in other words, has one degree of translational freedom; while the shearing blade 46 moves vertically with the head and horizontally with respect to the head, in other words, it has two degrees of translational freedom. The movement of the head carried shearing blades in the directions described will cause the shearing blade 34 to move through the web and one flange of the channel from the outside toward the inside, while the shearing blade 46 will move through the flange 12 in a direction from the inside toward the outside. The opposite surfaces of the web and flanges will, of course, be firmly supported by the shearing edges 10, 14, and 16 of the support plate 8. By supporting the flanged metal shape so that each of its elements is firmly supported on one side and engaged on the other side by moving shear blades traveling in the same general direction, it is obvious that distortion of the flanged metal shape is substantially prevented.

While the construction has been shown more or less in detail and illustrated as formed to shear a channel, it will be obvious to persons skilled in the art that by slight modifications and rearrangements of parts the construction may be changed to permit shearing of any flanged shape formed of a plurality of angularly disposed elements. All such modifications and rearrangements of parts are contemplated which fall within the scope of the appended claims defining my invention.

What is claimed is:

1. In a machine for shearing a channel shaped member having a web and at least two flanges the combination of, support means for the web and flanges provided with shearing edges, a vertically movable head structure carrying a shear blade adapted to be moved in a vertical direction only past certain of the shearing edges of the support means to shear the web and one flange of the channel shaped member, and a second shear blade carried by and movable with and also relative to said vertically movable head structure, said second shear blade having a horizontal movement during its vertical movement and moving past a shearing edge of the support means to shear the other flange of the channel.

2. In a machine for shearing a channel shaped member having a web and at least two flanges the combination of, support means for the web and flanges provided with shearing edges, a vertically movable head structure carrying a shear blade adapted to be moved vertically past certain of the shearing edges of the support means to shear the web and one flange of the channel shaped member from the outside, and a second shear blade carried by and movable with said vertically movable head structure, said second shear blade having a horizontal movement during its vertical movement and moving past a shearing edge of the support means to shear the other flange of the channel from the inside.

3. In a machine for shearing a flanged metal shape having a web and at least two flanges the combination of, support means for the web and flanges provided with shearing edges, and a pair of connected shear blades movable in unison in at least one direction adapted to be moved past the shearing edges of said support means to shear the flanged metal shape, one of said shear blades moving in said one direction only to shear the web and one flange of the flanged metal shape while the other shear blade has an added movement in another direction to shear the other flange of the metal shape.

4. In a machine for shearing a flanged metal shape formed of at least three angularly disposed elements the combination of, support means for one side of each of said angularly disposed elements, shearing edges formed on said support means, a first shear blade having one degree of translational freedom and movable past certain of said shearing edges to shear certain elements of the metal shape, and a second shear blade connected to said first blade and having two degrees of translational freedom and movable past other of said shearing edges to shear the remainder of the elements of the metal shape.

5. In a machine for shearing a flanged metal shape formed of at least three angularly disposed elements the combination of, support means for one side of each of said angularly disposed elements, shearing edges formed on said support means, a first shear blade having one degree of translational freedom and movable past certain of said shearing edges to shear certain elements of the metal shape, a second shear blade having two degrees of translational freedom and movable past other of said shearing edges to shear the remainder of the elements of the metal shape, means controlling the one degree of translational freedom of said shear blades, and additional means controlling the second degree of translational freedom of said second shear blade.

6. In a machine for shearing a flanged metal shape formed of at least three angularly disposed elements the combination of, a base member, support means carried by the base member and supporting one side of each of said angularly disposed elements, shearing edges formed on said support means, a substantially vertically reciprocal head member, a first shear blade rigidly attached to said head member and movable thereby past certain of said shearing edges to shear certain of said angularly disposed elements, a second shear blade carried by said head member and movable therewith in a substantially vertical direction and relative thereto in a substantially horizontal direction past other of said shearing edges to shear the remainder of said angularly disposed elements, and means formed on said base member and operable to cause the substantially horizontal movement of said second shear blade during its substantially vertical movement with the head member.

7. In a machine for shearing a flanged metal shape formed of at least three angularly disposed elements the combination of, support means for one side of each of the angularly disposed elements, and a pair of connected shear blades movable past portions of the support means and also relative to each other to shear each of said angularly disposed elements.

8. In a machine for shearing a channel member having a web and flanges directed to one side of the web the combination of support means for the inside of the web and one flange and for the outside of the other flange, and a pair of shear blades movable past portions of the support means and also relative to each other, one of said shear blades moving through the web and one flange from the outside toward the inside and the other shear blade moving through the remaining flange from the inside toward the outside.

JOHN SOUTAR.